US012652650B2

(12) United States Patent
Esswie et al.

(10) Patent No.: US 12,652,650 B2
(45) Date of Patent: Jun. 9, 2026

(54) METHODS AND APPARATUS FOR POWER EFFICIENT PAGING PROCEDURES FOR MULTIPLE SUBSCRIBER IDENTITY MODULES WTRUS

(71) Applicant: InterDigital Patent Holdings, Inc., Wilmington, DE (US)

(72) Inventors: Ali Esswie, Montreal (CA); Hussain Elkotby, Conshohocken, PA (US); Ravikumar Pragada, Warrington, PA (US)

(73) Assignee: InterDigital Patent Holdings, Inc, Wilmington, DE (US)

( * ) Notice: Subject to any disclaimer, the term of this patent is extended or adjusted under 35 U.S.C. 154(b) by 294 days.

(21) Appl. No.: 18/293,200

(22) PCT Filed: Aug. 3, 2022

(86) PCT No.: PCT/US2022/039279
§ 371 (c)(1),
(2) Date: Jan. 29, 2024

(87) PCT Pub. No.: WO2023/014794
PCT Pub. Date: Feb. 9, 2023

(65) Prior Publication Data
US 2024/0284401 A1 Aug. 22, 2024

Related U.S. Application Data

(60) Provisional application No. 63/229,337, filed on Aug. 4, 2021.

(51) Int. Cl.
*H04W 68/02* (2009.01)
*H04W 88/06* (2009.01)

(52) U.S. Cl.
CPC ............ *H04W 68/02* (2013.01); *H04W 88/06* (2013.01)

(58) Field of Classification Search
CPC ..... H04W 68/02; H04W 88/06; H04W 68/12; H04W 76/16; H04W 76/27;
(Continued)

(56) References Cited

U.S. PATENT DOCUMENTS

2012/0172029 A1* 7/2012 Lai ........................ H04W 68/00
455/422.1
2020/0359196 A1* 11/2020 Balasubramaniam ......................
H04W 88/06

FOREIGN PATENT DOCUMENTS

WO 2020257187 A1 12/2020
WO WO 2020/238127 A1 12/2020
(Continued)

OTHER PUBLICATIONS

3rd Generation Partnership Project, 3GPP TR 38.840 V16.0.0 (Jun. 2019), 74 pages.
(Continued)

*Primary Examiner* — Ankur Jain
(74) *Attorney, Agent, or Firm* — Flaster Greenberg P.C.

(57) ABSTRACT

A method and configurations are discussed relative to a wireless transmit/receive unit (WTRU) in the form of a multi subscriber identity module (MUSIM). The paging information for the WTRU may be optimized for power consumption. The paging information may be modified to provide one or more of a maximum deep sleeping time duration requirement, a minimum number of power state transitions, and minimum power penalty associated with power state transitions. The modified paging information may set a paging occasion offset windows and a time direction indication associated therewith.

19 Claims, 8 Drawing Sheets

(58) Field of Classification Search
CPC .......... H04W 68/005; H04W 52/0216; H04W 8/183; Y02D 30/70
See application file for complete search history.

(56) References Cited

FOREIGN PATENT DOCUMENTS

WO      WO 2021/007696 A1      1/2021
WO      WO 2021/083801 A1      5/2021

OTHER PUBLICATIONS

3rd Generation Partnership Project, "Paging enhancements for UE power saving", InterDigital, Inc., R1-2101503, 3GPP TSG RAN WG1 #104-e, e-Meeting, Jan. 25-Feb. 5, 2021, 4 pages.
3rd Generation Partnership Project, "Design of Paging Enhancements", Ericsson, R1-2101555, 3GPP TSG-RAN WG1 Meeting #104-e, e-Meeting, Jan. 25-Feb. 5, 2021, 9 pages.
3rd Generation Partnership Project, "Discussion on paging enhancements", R1-2101622, 3GPP TSG RAN WG1 #104-e, e-Meeting, Jan. 25-Feb. 5, 2021, 9 pages.
3rd Generation Partnership Project, "TRS CSI-RS for idle inactive UE power saving", Qualcomm Incorporated, R1-2101475, 3GPP TSG-RAN WG1 #104-e, e-Meeting, Jan. 25- Feb. 5, 2021, 6 pages.
3rd Generation Partnership Project, "Discussion on TRS CSI-RS occasion for idle/inactive UEs", NTT Docomo, Inc., R1-2101623, 3GPP TSG RAN WG1 #104-e, e-Meeting, Jan. 25-Feb. 5, 2021, 4 pages.
3rd Generation Partnership Project, "Analysis on power consumption for IDLE mode and RedCap", Huawei, R1-2103389, 3GPP TSG RAN WG1 Meeting #104bis-e, E-meeting, Apr. 12-20, 2021, 7 pages.
3rd Generation Partnership Project, "Paging collision avoidance", Ericsson, R2-2105978, (Revision of R2-2103757), 3GPP TSG-RAN WG2 #114e, Electronic meeting, May 19-27, 2021, 8 pages.
3rd Generation Partnership Project, "Solution analysis for supporting Multi-SIM paging cause", Intel., R2-2106103, 3GPP TSG-RAN WG2 Meeting #114-e, Electronic Meeting, May 19-27, 2021, 9 pages.
Y. R. Li, M. Chen, J. Xu, L. Tian and K. Huang, "Power Saving Techniques for 5G and Beyond," in IEEE Access, vol. 8, pp. 108675-108690, 2020.

* cited by examiner

FIG. 2

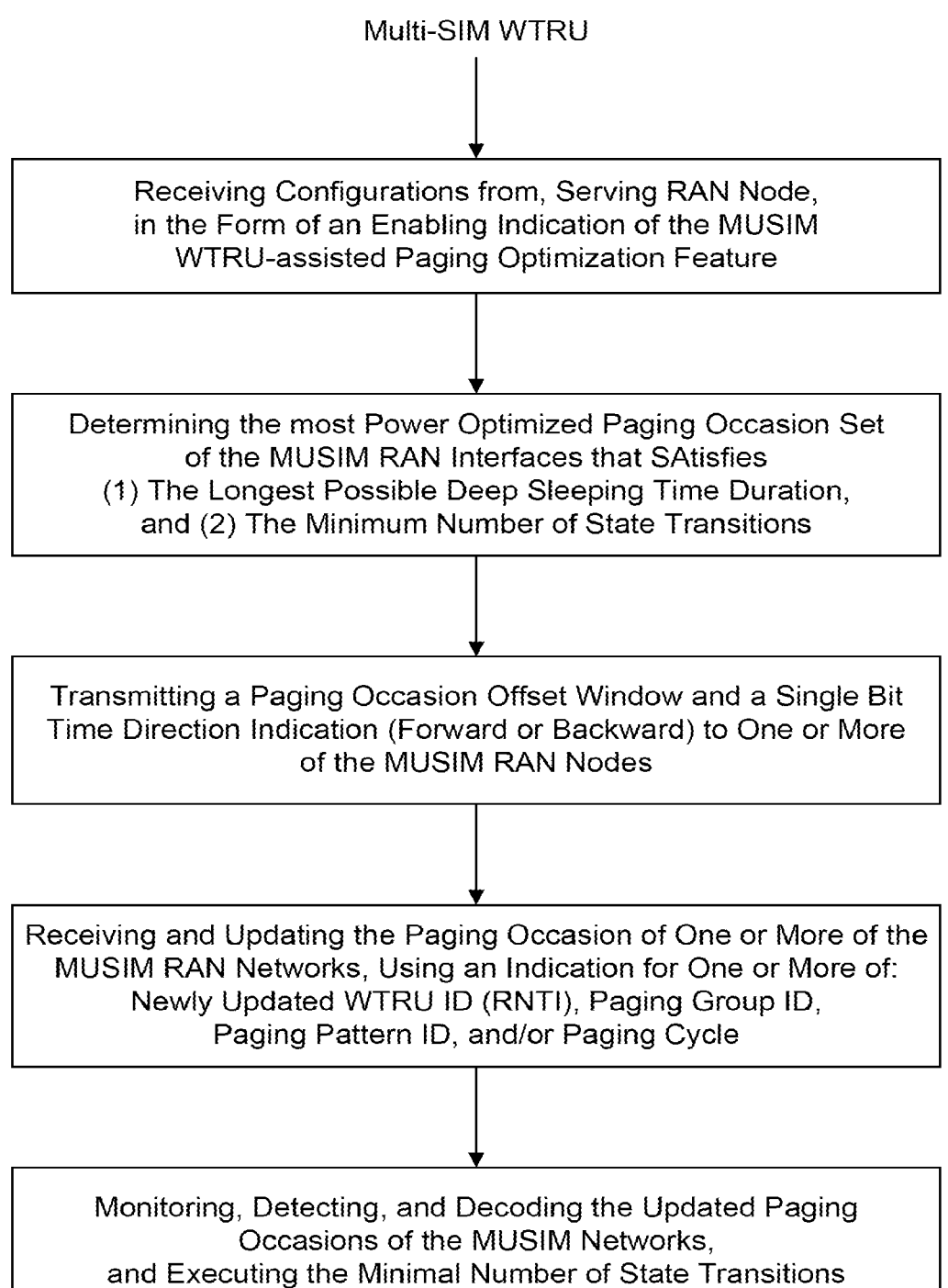

Multi-SIM WTRU

Receiving Configurations from, Serving RAN Node,
in the Form of an Enabling Indication of the MUSIM
WTRU-assisted Paging Optimization Feature Determining the most Power Optimized Paging Occasion Set
of the MUSIM RAN Interfaces that SAtisfies
(1) The Longest Possible Deep Sleeping Time Duration,
and (2) The Minimum Number of State Transitions Transmitting a Paging Occasion Offset Window and a Single Bit
Time Direction Indication (Forward or Backward) to One or More
of the MUSIM RAN Nodes Receiving and Updating the Paging Occasion of One or More of the
MUSIM RAN Networks, Using an Indication for One or More of:
Newly Updated WTRU ID (RNTI), Paging Group ID,
Paging Pattern ID, and/or Paging Cycle Monitoring, Detecting, and Decoding the Updated Paging
Occasions of the MUSIM Networks,
and Executing the Minimal Number of State Transitions

FIG. 4

Multi-SIM WTRU

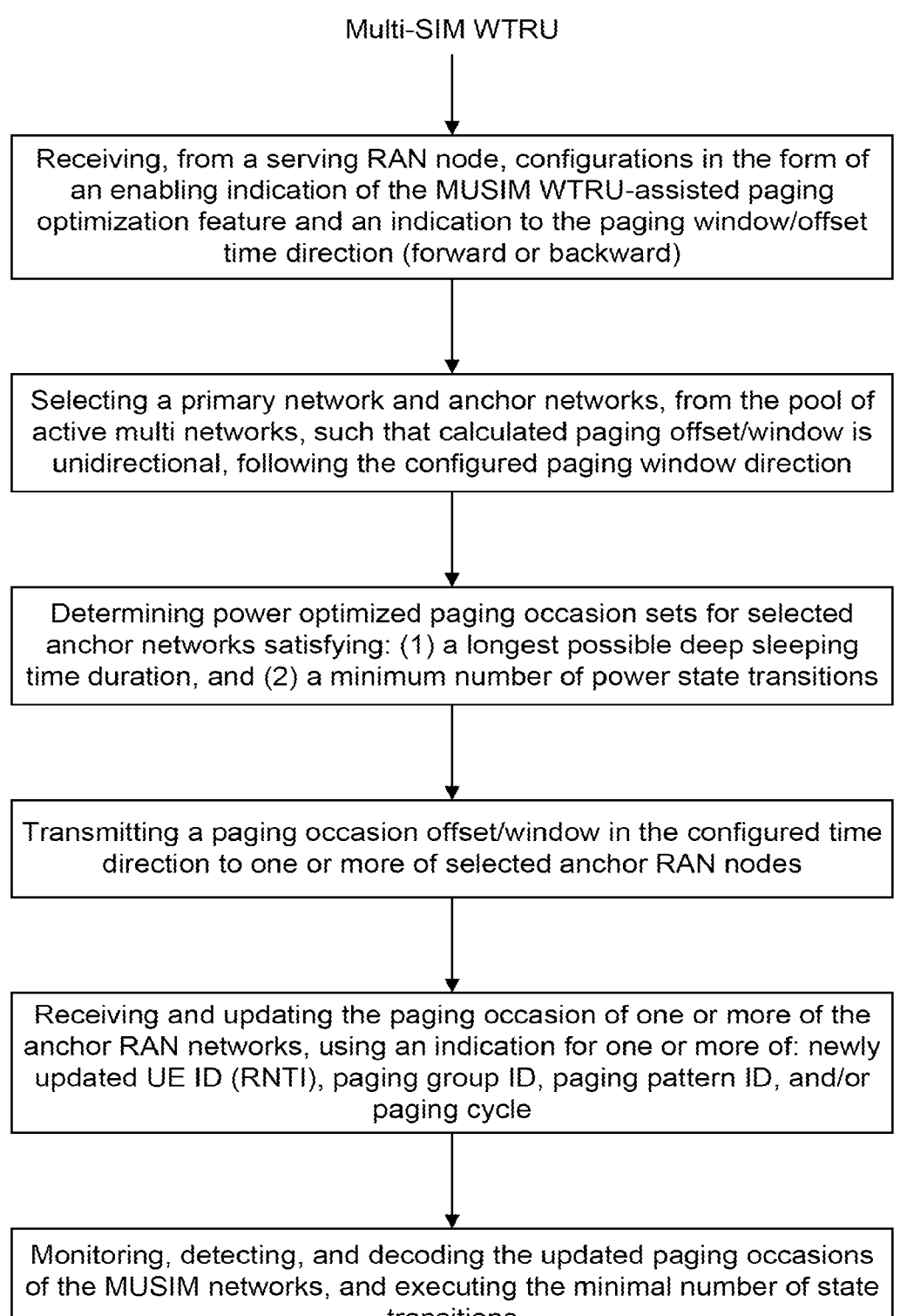

Receiving, from a serving RAN node, configurations in the form of an enabling indication of the MUSIM WTRU-assisted paging optimization feature and an indication to the paging window/offset time direction (forward or backward)

Selecting a primary network and anchor networks, from the pool of active multi networks, such that calculated paging offset/window is unidirectional, following the configured paging window direction Determining power optimized paging occasion sets for selected anchor networks satisfying: (1) a longest possible deep sleeping time duration, and (2) a minimum number of power state transitions Transmitting a paging occasion offset/window in the configured time direction to one or more of selected anchor RAN nodes Receiving and updating the paging occasion of one or more of the anchor RAN networks, using an indication for one or more of: newly updated UE ID (RNTI), paging group ID, paging pattern ID, and/or paging cycle Monitoring, detecting, and decoding the updated paging occasions of the MUSIM networks, and executing the minimal number of state transitions

FIG. 5

METHODS AND APPARATUS FOR POWER EFFICIENT PAGING PROCEDURES FOR MULTIPLE SUBSCRIBER IDENTITY MODULES WTRUS

CROSS-REFERENCE TO RELATED APPLICATIONS

This application is the 371 National Stage of International Application No. PCT/US2022/039279, filed Aug. 3, 2022, which claims the benefit of U.S. Provisional Patent Application No. 63/229,337, filed Aug. 4, 2021, the disclosure of which is incorporated herein by reference in their entirety.

FIELD OF THE INVENTION

This disclosure pertains to methods and apparatus of/for Wireless Transmit and/or Receive Units (WTRUs) in wireless communication systems.

BACKGROUND

The present disclosure relates to any of paging procedures in $5^{th}$ Generation (5G) and/or new radio (NR) systems, power saving enhancements for 5G NR idle/inactive WTRUs, and Multi-SIM operation and multi-SIM paging.

SUMMARY

According to embodiments, a WTRU may be configured or a method may be performed for operation as a multi-subscriber identity module (MUSIM) device. A message may be provided to a first network regarding operation of the WTRU as a MUSIM device and information may be received from the first network indicating an initial paging occasion associated with the first network. The WTRU may send paging assistance information to the first network. The paging assistance information may include, among other things a first offset, a second offset, and a direction indication. According to embodiments, the first offset may indicate a minimum offset relative the initial paging occasion associated with the first network, the second offset may indicate a maximum offset relative to the initial paging occasion associated with the first network, and the direction indication may indicate whether the first and second offsets should be applied before or after the initial paging occasion associated with the first network. The network may provide information indicating an updated paging occasion, which may be signaled as one of a new WTRU-ID, paging group ID, paging pattern ID, paging cycle and/or other information.

In embodiments, the first and second offsets of the first network may be determined by the WTRU based a paging occasion associated with a second network. Further, the first and second offsets of the first network may be optimized relative to power usage of the WTRU. In embodiments, the first and second offsets of the first network may be optimized for one or more of a longest possible deep sleeping time duration between paging occasions, a minimum number of state transitions, and a minimum power penalty associated with power state transitions. In embodiments, the first and second offsets for the first network may be determined based on a minimum and maximum offset thresholds for a set of paging occasions for both the first and second networks.

In embodiments, the WTRU may select the first and second networks, for example, from a pool of (e.g., multiple) active and available networks such that the first and second offsets of the first network have a unidirectional indication. The updated paging occasion associated with the first network may occurs between the minimum and maximum offsets relative to the initial paging occasion associated with the first network. One or more of the other elements may be combined and incorporated into the configuration and method of operation.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein:

FIG. 2 is a diagram illustrating examples of a WTRU-assistance based MUSIM paging optimization, according to embodiments;

FIG. 4 is a diagram illustrating an example of WTRU actions/procedures for power efficient MUSIM paging, according to embodiments; and FIG. 5 is a diagram illustrating a further example of WTRU actions/procedures for power efficient MUSIM paging with primary network and anchor network determinations, according to embodiments.

DETAILED DESCRIPTION

Introduction

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

3

Example Networks for Implementation of the Embodiments

Figure 1A:
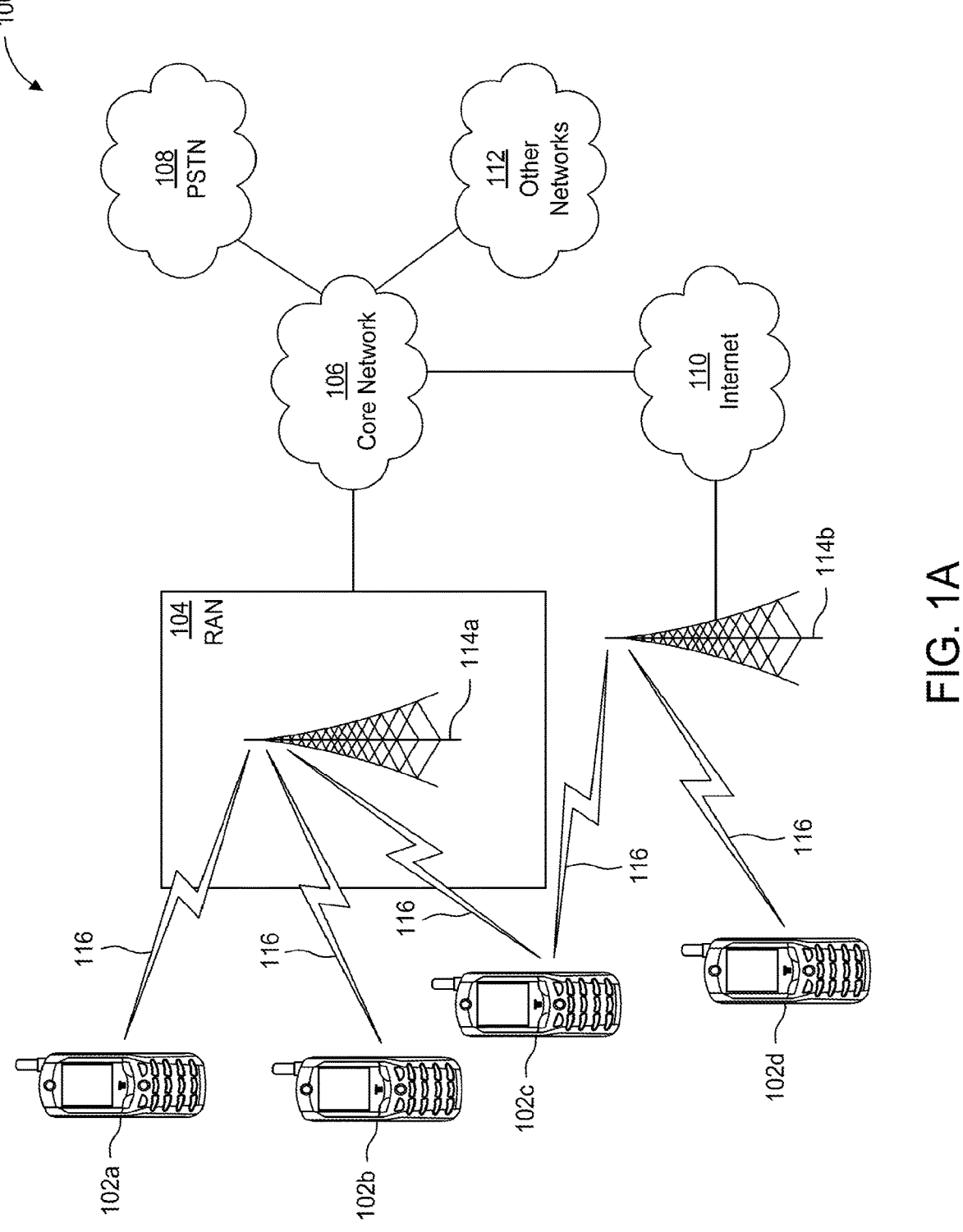
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
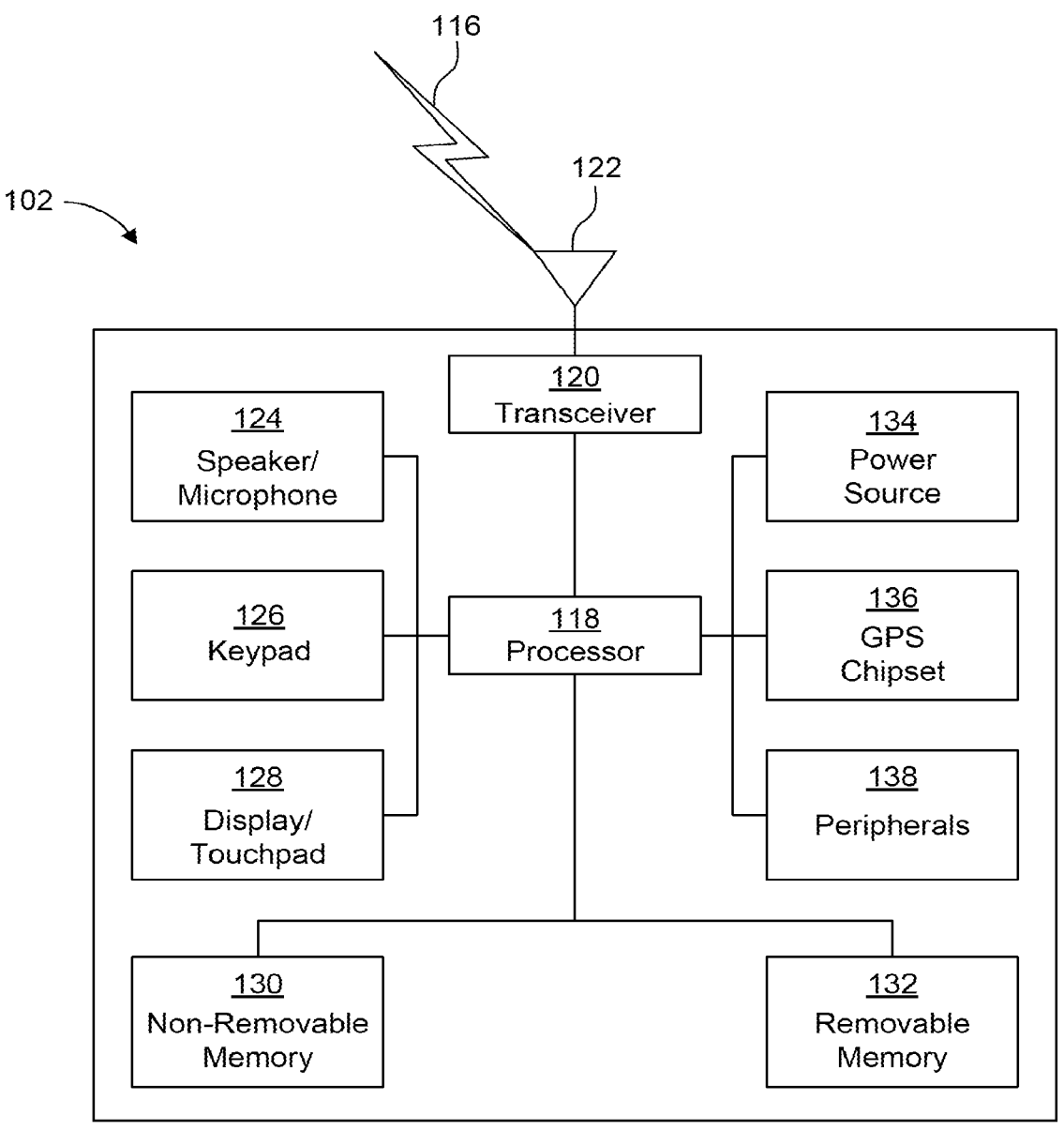
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception).

Figure 1C:
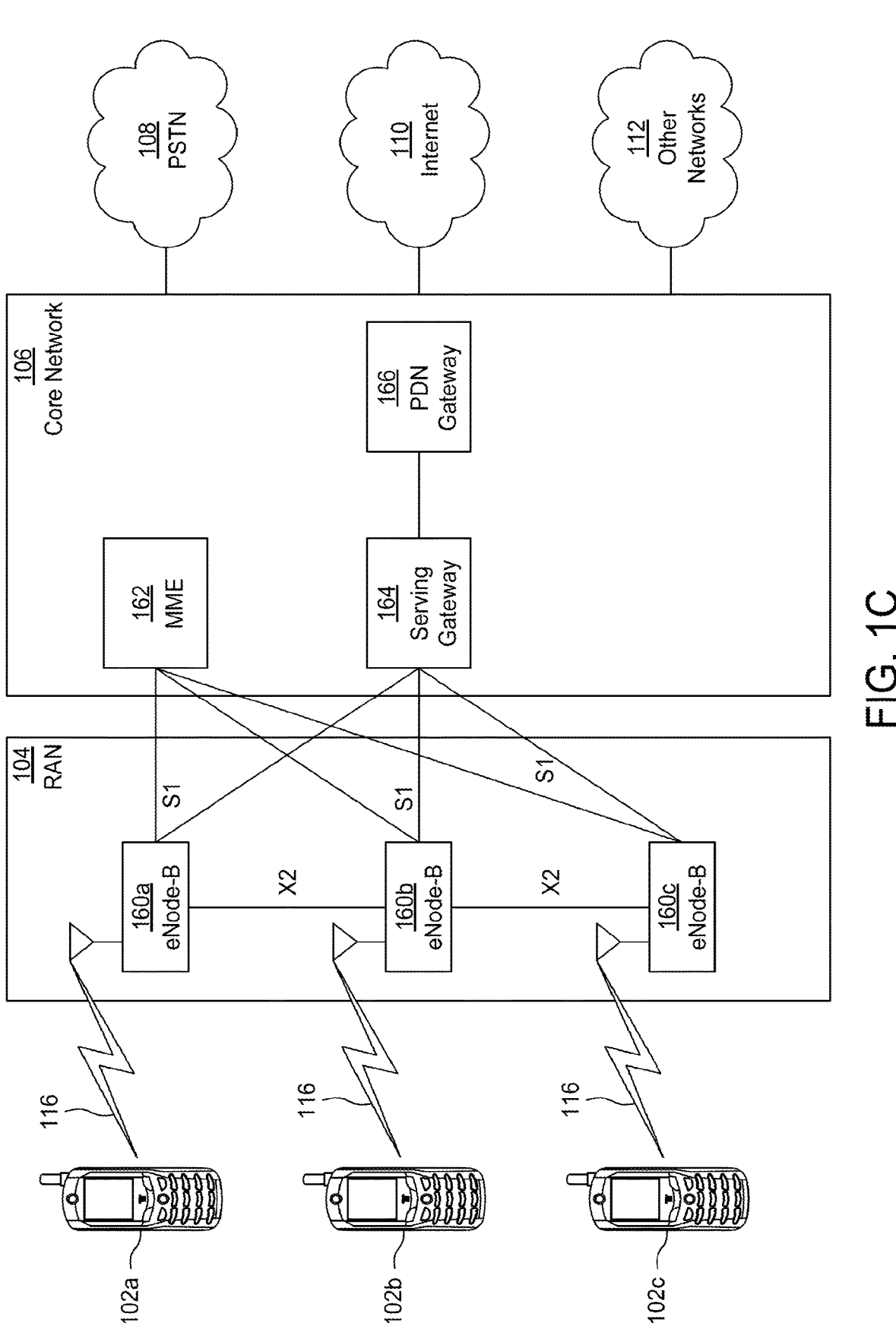
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHZ wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
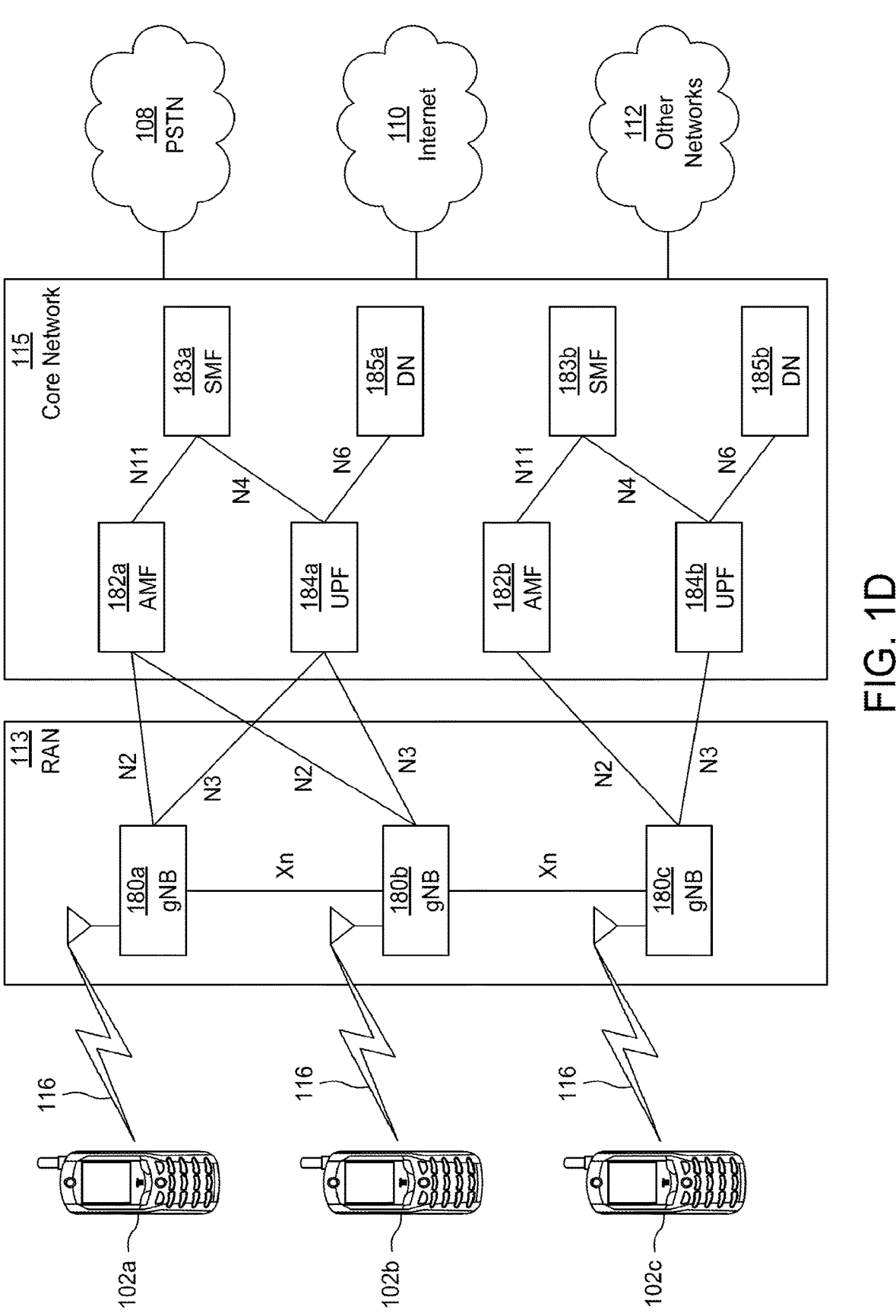
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology.

For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Paging Procedures for 5G/NR Systems

A WTRU in an in idle and/or inactive mode can (e.g., should, ideally, etc.) be deep sleeping, for example, by shutting down their transceiver end(s), for example, in a case where there is no incoming traffic for the transceiver end(s).

In such a case of deep sleeping, for a WTRU to get notified (e.g., to be made aware) of an incoming downlink payload, the network configures idle and/or inactive WTRUs with a (e.g., periodic) set of occasions, for example, within (e.g., certain, a set of, etc.) frames in which an idle and/or inactive WTRU can (e.g., should) periodically wake up, perform monitoring, and determine whether there is a paging indication. That is, in a case of RRC IDLE and/or INACTIVE modes, WTRUs are continuously waking up according to a configured paging cycle, for example, in order to check if a single or multiple WTRUs are being paged in a current paging occasion. Therefore, WTRUs follow the following three steps, for example, before transitioning to RRC CONNECTED state for getting paged.

As a first step for transitioning to RRC CONNECTED state for getting paged, for example, in a case where WTRUs may be out of sync with the radio interface, for example, due to a long (e.g., deep) sleep period, WTRUs can (e.g., first) attempt re-synching with the NR radio interface, for example, by detecting a (e.g., at least one) synchronization signal block (SSB). In such a case, different WTRUs having different implementations (e.g., from various WTRU vendors) may require a different number of SSBs (e.g., radio sequences), for example, before the different WTRUs get in full sync with the network. For example, WTRUs in good signal-to-interference-noise-ratio (SINR) conditions can re-sync with the radio network, for example, by detecting a single SSB (e.g., sequence signal, radio sequences, etc.). However, in such a case of the first step, WTRUs in poor (e.g., ill) SINR conditions may require additional SSB instances.

As a second step for transitioning to RRC CONNECTED state for getting paged, for example, in a case where (e.g., after) WTRUs are in full sync with a network (e.g., a RAN), WTRUs attempt to blindly decode the paging downlink control information (DCI) sent on possible physical downlink control channel (PDCCH) occasions (e.g., channel resources pre-configured by higher layers). The paging DCI implies (e.g., provides) an indication, to the idle/inactive WTRUs, that there is at least a single WTRU with incoming traffic in the downlink direction. In a case where there is NO paging DCI detected over the PDCCH resources, idle/inactive WTRUs assume that there is no paging in the current paging opportunity, and hence, such WTRUs continue sleeping until the next paging occasion.

As a third step for transitioning to RRC CONNECTED state for getting paged, for example, in a case where idle/inactive WTRUs detect the presence of the paging DCI, then, in the paging occasion, the idle/inactive WTRUs may decode (e.g., subsequent) physical downlink shared channel (PDSCH) data resources to read the paging record. The paging record is an indication of the ID or IDs of the idle/inactive WTRU(s) getting paged. For a WTRU, in a case where the paging record contains the WTRU's temporary ID, the WTRU then triggers the random-access procedure, for example, in order to switch to a RRC CONNECTED state.

In a case of a (e.g., conventional, prior art, etc.) paging procedures for 5G/NR Systems, there are (e.g., typically) multiple tradeoffs to achieve a decent paging performance. For example, in a case of a frequency of paging occasions and (e.g., transmitting) paging DCI, more frequent paging occasions and paging DCIs can lead to less packet buffering delay. However, in such case of more frequent paging occasions, there may be the following problems/limitations: (1) WTRUs waking up more frequently impacts battery consumption/performance; and (2) a consumption of the PDCCH control channel capacity. That is, having more frequent paging DCIs implies a larger size of the PDCCH CORESET, and hence, less remaining PDCCH resources for other control and scheduling information, and overall, less bandwidth part data resources of the data transmissions over the PDSCH.

In view of the above discussed three steps, and/or in view of the above discussed problems/limitations, according to embodiments, there is a need for a more flexible procedure for delivering paging information, for example, which may be vital for achieving a decent paging performance, and power saving gains at WTRUs, while not overloading/consuming network resources with downlink control information.

Power Saving Enhancements for 5G/NR Idle/Inactive WTRUs

In a case of 5G/NR systems and future wireless and/or cellular networks, there is (e.g., as has been in the past) a need for enhancing the performance of (e.g., decreasing battery consumption used for/by paging) an idle/inactive WTRU, or in other words, enhancing a WTRU power saving capability. Regarding such power saving enhancements, there are two areas of study (e.g., focus, refinement, research, etc.): (1) an early paging indication (EPI); and (2) assistance paging-specific reference signals.

As discussed above, there may be a conventional case of idle and/or inactive (e.g., mode) WTRUs which (e.g., always) wake up during the paging occasion to detect the paging DCI (e.g., by blindly decoding the possible PDCCH opportunities). In such a case, and if there is no paging DCI (i.e., no paging indication), WTRUs sleep (e.g., again) until the next paging occasion. Such (e.g., repeated) blind decoding draws considerable amounts of power from WTRU's batteries, and are unnecessary in a case where the WTRUs are not actually paged. In the above conventional case of idle and/or inactive WTRUs, there is a need for an EPI downlink control information (DCI). EPI DCI may precede a paging occasion, and may indicate whether paging DCI over the PDCCH is present or not present. In a case of a false EPI (e.g., a case of EPI DCI being not present in the PDCCH), a WTRU may (e.g., shall, should, etc.) assume that (e.g., at least) its paging group is not paged and the WTRU may continue deep sleeping until a next paging occasion.

According to embodiments, there may be dynamic EPI, for example, a dynamic EPI enabling procedure, for maintaining (e.g. providing increased) WTRU and/or group (e.g., WTRU specific and/or WTRU group specific) battery performance/power saving gain, for example, while not overloading the system with unnecessary control information, i.e., EPI DCI. That is, in view of the above noted conventional case of EPI DCI, there is a need for dynamic EPI.

Regarding assistance paging-specific reference signals, idle/inactive WTRUs wake earlier before each paging occasion to get in full sync with the network. Without being fully synchronized with the RAN, idle/inactive WTRUs will not be able to detect the EPI DCI, paging DCI, and paging record. Different WTRUs (e.g., from different vendors, and/or in different SINR conditions, etc.) (e.g., are required to) detect various numbers of the synchronization signal blocks (SSBs) before the paging occasion. However, the transmission of the SSBs typically has a fixed large periodicity, such as, a minimum of 20 milliseconds (ms). As a result, idle/inactive WTRUs wake up over a duration of multiple SSBs' period before each paging occasion, which is a significant limitation (e.g., stress, demand, problem, etc.) on power saving by the WTRUs. In such a case of assistance paging-specific reference signals, a network transmits aiding paging-specific reference signals that are close in time to each of the paging occasions, and idle/inactive WTRUs only wake up just slightly before such occasions. In view of the above limitations, there is a need for improvements to paging-specific reference signals and associated procedures.

According to embodiments, there may be any of flexible semi-static, dynamic, and hybrid procedures for paging-specific reference signals for future wireless networks.

Multi-SIM (MUSIM) Operation and Paging

In view of WTRU handset manufacturing increasingly including Multiple-Subscriber Identity Module (MUSIM, MU-SIM, etc.) WTRUs, MUSIM operation is an important (e.g., integral) part of future wireless communications, such as wireless communications described (e.g., specified) by 3GPP Release-17 (R17). That is, there is a need (e.g., as aimed for by 3GPP R17) for achieving an optimized paging procedure for the MUSIM WTRUs. Conventionally (e.g., in the related art), MUSIM WTRUs, with different SIMs from different and/or same operators, (e.g., must, should, etc.) monitor all paging occasions and resources for each of the active SIM chips. Furthermore (e.g., in addition to the significant power consumption of MUSIM WTRUs), configured paging occasions can be aligned partially and/or fully among various SIMs which may be from different network operators. In such a case, a conventional (e.g., standard) MUSIM WTRU, having (e.g., only for) a single RF chain, may only be able to detect and decode one of the configured paging occasions of one of the active SIM chips.

In a case of a MUSIM WTRU having multiple RF chains, multiple paging occasions can be detected and decoded at the same time. However, in such a case, there may be WTRU behavior inconsistencies in detecting the paging occasions, which, for example, is related to specifics of WTRU manufacturer implementation. That is, there may be a case where some MUSIM WTRUs detect certain paging occasions for a certain operator, while other MUSIM WTRUs may randomly detect and decode other paging occasions from other operators without regularization. In such a case, network paging key performance indicator (KPI) monitoring and optimization operation can be a challenging task. Furthermore, in a separate case or in the case above, there can be frequent paging failures, for example, due to MUSIM WTRUs not being able to simultaneously detect multiple paging occasions, there may be: (1) frequent paging escalations which greatly degrade the power consumption of other idle/inactive WTRUs (e.g., for the impacted operator), for example, due to the frequent unnecessarily paging monitoring and decoding, and (2) a significant network resource overhead of the paging bandwidth part. For the case of a conventional (e.g., prior art) MUSIM WTRU, for example, as discussed by 3GPP partners for R-17, there may be paging refinements for MUSIM WTRUs. In particular, the introduction of the paging cause as part of the paging signaling is (e.g., proposed) to be transmitted and processed by the MUSIM WTRUs. That is, a paging cause indicates the MUSIM WTRUs of a (e.g., high-level of) paging reason, such as, for example, voice calls, data sessions and/or system information update. In such a manner, the behavior of the MUSIM WTRUs is controlled so that network paging failure due to the MUSIM WTRU penetration is minimized. Such 3GPP partner discussions, and/or other similar research, development, and/or specification efforts for MUSIM WTRUs is to continue over the upcoming 3GPP releases. However, the power efficiency of the MUSIM WTRUs is not addressed yet.

According to embodiments, for example, as discussed herein below, there may be energy efficient MUSIM WTRUs, for example, to address the above discussed problems of conventional paging and/or conventional MUSIM WTRUs.

In view of the above discussed conventional MUSIM WTRUs, and their above discussed conventional operation, paging, and operation saving features, there may be two challenges to be addressed: (1) MUSIM WTRUs may deep and/or light sleep over much less time duration, or not sleep at all during idle/inactive mode operation; and (2) a conventional WTRU (e.g., see 3GPP Release-16) performs power ramp-up and ramp-down transition periods for each transition from one sleep state to another, which impose any of additional power consumption and latency burden. That is, in a case of MUSIM WTRUs, multiple paging cycles and paging occasions in one or multiple paging frames should be always monitored by the MUSIM WTRUs, for example, to identify if they have been paged by one or more of the multiple connected networks. In a case of such operations by conventional MUSIM WTRUs includes multiple periodical blind decoding of the multiple paging EPIs, paging DCIs, and receiving of the corresponding paging records, respectively. In such a case (e.g., consequently), there is a (e.g., clear) degradation of the power consumption performance, which, for example, highlights the above noted two challenges to be addressed.

The above noted challenge regarding MUSIM WTRUs performing deep and/or light sleep over a much less time duration (e.g., as compared to a single SIM WTRU), or not sleeping at all can be a result of multiple subsequent paging occasions. That is, the multiple subsequent paging occasions for the multiple networks may be sub-optimally placed in the time domain, for example, so as to prevent the MUSIM WTRUs from deep or light sleeping, for example, in a case where a minimum expected sleeping duration should be maintained for the WTRU to enter the deep/light sleep state. That is, in the case where a minimum expected sleep duration is not satisfied, for example, (e.g., mainly) due to the MUSIM paging occasions, the WTRUs shall not enter the deep/light sleep states in the idle mode, which imposes a significant power consumption for MUSIM WTRUs. The suboptimal time locations of the MUSIM paging occasions are beyond the control of the WTRU, and are (e.g., mainly) dependent on WTRU ID (e.g., RNTI, TMSI, etc., which is provided by each network operator RAN interface), and the network-specific cell-specific paging parameters, such as the paging cycle. The above noted case, for example, having the sub-optimal time locations of the MUSIM paging occasions, may include assuming no tight coordination between various collocated RAN operators, which is a reasonable assumption to avoid the challenges of the governmental regulations, inter-operator's policy regularization, and the compatibility of various network vendor equipment's for different operators.

The above noted challenge regarding power ramp-up and ramp-down, that is, a WTRU power model (e.g., as defined in R-16 3GPP TR 38.840), WTRUs require ramp up and down transition periods between each transition from one sleep state to another, and such imposes an additional power consumption and a latency burden. For instance, to transition from deep sleep to an active state for paging monitoring, WTRUs require an average of 20 ms of latency, consuming 450 power units. Conventional WTRUs (e.g., 3GPP R-16 WTRUs) shall not trigger a sleeping state if the expected sleeping time is comparable to the overhead delays required to transition out of the sleeping state. Such power and latency overhead is typically compensated by the long sleeping duration of the WTRU RF chains. However, for MUSIM WTRUs, the sleeping times can be frequently interrupted due to the multi-SIM paging occasions, thus, by adding the ramping up and down overhead on top, it becomes challenging for MUSIM WTRUs to deep/light sleep for longer durations without interruption.

Furthermore, the frequent transitions between the various power states while incurring the ramp up and down power overhead in a frequent manner is recognized as a vital problem for MUSIM WTRUs. That is, as discussed above, it is (e.g., highly) challenging for MUSIM WTRUs to deep/light sleep for (e.g., longer) durations during the idle/inactive mode, due to the MUSIM paging occasions, for which the MUSIM WTRUs have no control over. Furthermore, the frequent transitions between the various sleeping states of the MUSIM WTRUs, due to the multiple MUSIM paging occasions, while exhibiting the power ramping up and down overhead imposes a significant power saving limitation.

According to embodiments, in a case of MUSIM WTRUs, for example, that are in idle/inactive mode, there may be (e.g., decent) power saving by such WTRUs, for example by using WTRU assistance for enabling power-efficient optimization of MUSIM paging. According to embodiments, enabling power-efficient optimization of MUSIM paging using WTRU assistance may include any of the below discussed aspects. According to embodiments, MUSIM WTRUs may preserve an idle-mode power optimized state for a longer duration. For example, according to embodiments, multiple (e.g., different and/or repeated) SIM paging occasions may be placed (e.g., arranged, configured, etc.) in time so that the expected sleeping time is sufficient enough for the MUSIM WTRUs to trigger a power optimized power state, e.g., deep sleeping.

According to embodiments, in a case of a power efficient MUSIM paging procedure, frequent sleep state transitions should be avoided, for example, in order to reduce the power consumption and/or latency overhead of the ramping up and down operations. According to embodiments, there may be a WTRU-specific paging time offset window (e.g., backwards or forward in time). According to embodiments, there may be a (e.g., new) WTRU-assistance based scheme, including MUSIM WTRUs indicating and/or signaling indicating (e.g., sending information), to one or more of the connected RAN networks, a WTRU-specific paging time offset window (e.g., backwards or forward in time). According to embodiments, there may be multiple ways/schemes for such signaling, for example, as discussed herein below. According to embodiments, a WTRU-specific paging time offset window (which may be referred to herein as an offset window) may enable each MUSIM WTRU to optimize its MUSIM paging settings, for example, in order to retain a power friendly state for a long(er) duration. According to embodiments, in a case of receiving the MUSIM paging offset window request, a network (e.g., a RAN node) may perform any of the following: (1) change a temporary WTRU ID such that its own paging occasion set is offset according to a required/signaled window, or (2) change the paging cycle (e.g., periodicity) to enhance the power efficiency performance of the MUSIM WTRUs.

WTRU-Assistance Based Dynamic MUSIM Paging Power Optimization

Figure 2:
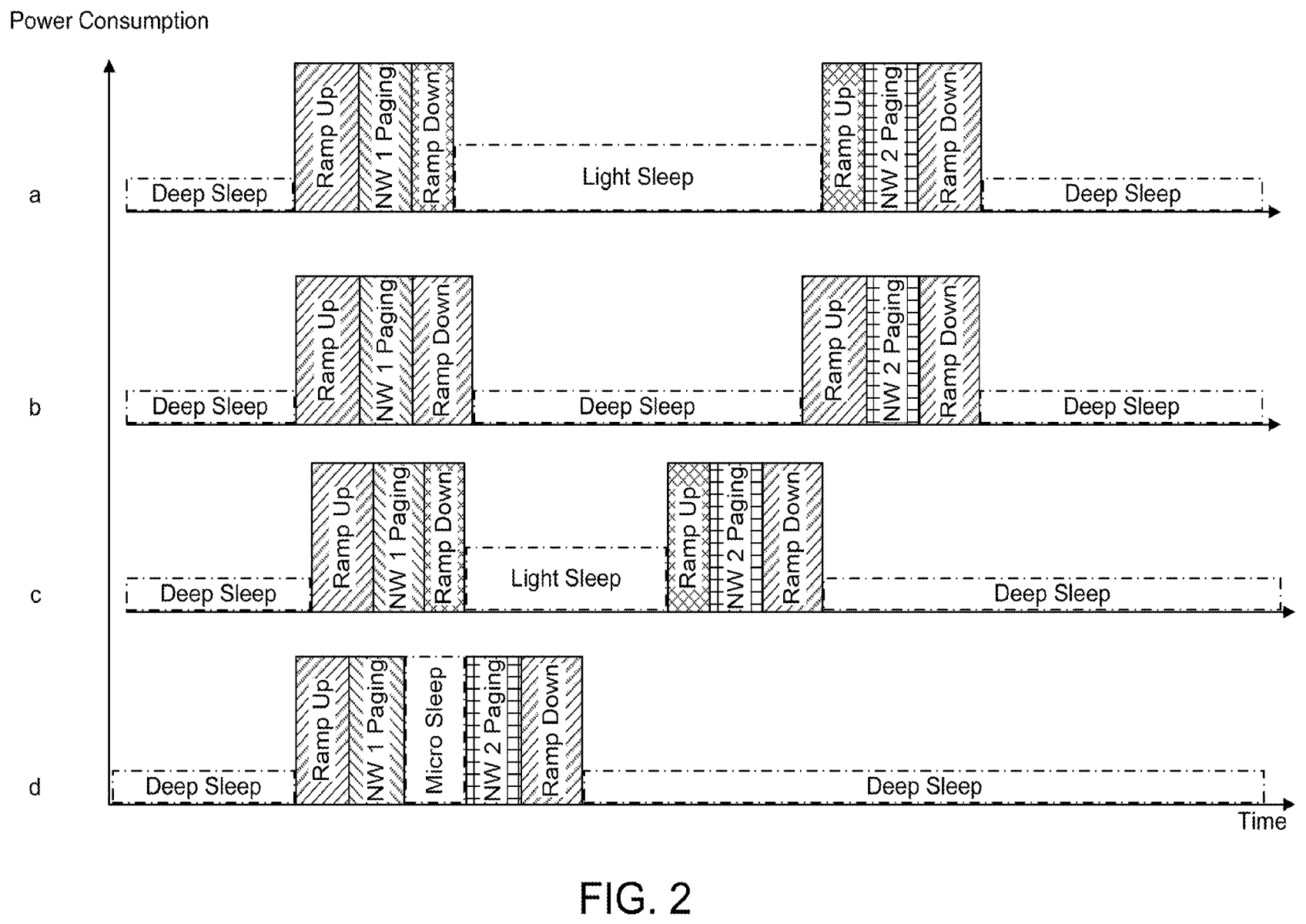

FIG. 2 is a diagram illustrating a WTRU-assistance based MUSIM paging optimization, according to embodiments.

According to embodiments, there may be a WTRU-assistance based scheme for a power efficient MUSIM paging operations. Referring to FIG. 2, parts (A) and (B) show the cases where there no MUSIM WTRU assistance is offered. As shown in part (A) of FIG. 2, there may be a case of insufficiently time placed MUSIM paging occasions (e.g., the time placement of MUSIM paging occasions being insufficient for deep sleep), and the MUSIM WTRU may be incapable of triggering a deep sleeping state, for example, since the expected sleeping duration is interrupted by a second network's paging occasions. In such a case, the MUSIM WTRU may trigger the power less efficient light sleep state until the paging occasion of the second network. As shown in part (B) of FIG. 2, there may be a case where both MUSIM paging occasions may be placed with a time separation sufficient enough for the MUSIM WTRU to trigger a deep sleep state. In such a case (e.g., however), such sufficient time separation may result in frequent power state transitions and hence, incurring a power penalty and latency overhead for the receiver ramping up and down.

Referring to FIG. 2, parts (C) and (D) show the cases where WTRU-assistance may be incorporated by indicating one or more of the connected RAN networks by the required paging offset window, according to embodiments. That is, as shown in parts (C) and (D) of FIG. 2, a MUSIM WTRU may inform (e.g., send signaling to) any number of (e.g., connected, wireless, cellular, available, etc.) networks regarding a required paging offset window. As shown in part (C) of FIG. 2, according to embodiments, for example, based on the indicated WTRU paging offset window, a node of a second RAN network may change the (e.g., it's respective) configured paging occasion for a MUSIM WTRU to be closer in time to the paging occasion of network 1. According to embodiments, in such a case, the MUSIM WTRU may trigger a light sleep state until the next paging occasion of the second RAN network, for example, while incurring less overhead (e.g., in terms of latency and power consumption) due to the transition from the light sleep state to the active state (e.g., as compared to the overhead of the transition from the deep state to the active state).

As shown in part (D) of FIG. 2, according to embodiments, there may be a (e.g., more) power-optimized case is depicted based on (e.g., the above noted, new) WTRU assistance. According to embodiments, in such a case, it may be assumed that, based on the suggested paging offset window from the MUSIM WTRU, the second RAN network may configure a (e.g., more) closely spaced paging occasion, for example, as compared to the paging occasions of the first RAN network. According to embodiments, in such a case, the MUSIM WTRU may trigger a (e.g., quick, micro, short, etc.) sleep state, for example, until the MUSIM WTRU monitors both networks' paging occasions, and, for example, accordingly triggers a long and/or uninterrupted deep sleeping state. In such a case, the MUSIM WTRU may incur a minimal overhead and power penalties, avoiding the frequent overhead for power ramp up and ramp down, for example, while staying in a power friendly state for a longer time, and while achieving a (e.g., more decent) power saving gain.

According to embodiments, in a first case a MUSIM WTRU may (e.g., accordingly) signal one or more of the RAN networks (e.g., serving MUSIM WTRUs, which may be referred to as a MUSIM RAN) with a required paging offset window as any number of thresholds, offsets, values, etc. According to embodiments, there may be a case where paging offset window signaling includes: (1) a recommended WTRU-specific maximum time offset, for example, in terms of any of time (e.g., ms), slots, and/or OFDM symbols, and (2) a single-bit indication whether the recommended paging offset is forward or backward compared to current paging settings.

According to embodiments (e.g., as alternate to a single offset value in the first case), there may be a second case where a MUSIM WTRU signals one or more of the MUSIM networks with at least two offset thresholds, including at least: (1) a minimum offset threshold, (2) a maximum offset threshold, (3) a paging occasion set of other RAN network(s) (e.g., in terms of slots, system frame number (SFN), etc.), and (4) a single-bit indication whether the recommended paging offsets are forward or backward as compared to current paging settings. According to embodiments, in the second case (e.g., unlike the first case), there may be (e.g., more) flexibility at the RAN side, for example, so as not to position the updated paging occasion set too close to the other RAN networks paging occasions. In such a case, the WTRU processing delay of the former paging occasion may be accounted for. For example, in a case of two immediately consecutive paging occasions of different RAN networks, the MUSIM WTRU may not be able to monitor the second (e.g., latter, following, subsequent, etc.) paging occasions, for example, because of the MUSIM WTRU-specific processing delay of the former paging occasion. According to embodiments, for example, in such a case, the minimum offset threshold may indicate a RAN node having the minimum offset desired by the MUSIM WTRU, which accounts for the MUSIM WTRU's (e.g., its own) processing delay in monitoring successive MUSIM paging occasions.

According to embodiments, signaling of (e.g., indicating, informing of, notifying of, etc.) the MUSIM paging offset window may be any of part of or a trigger for a radio notification area update (RNAU) and/or for a temporary RACH and/or RRC signaling establishment. According to embodiments, there may be any of (e.g., new, newly proposed, etc.) information (e.g., a newly proposed information element (IE) and/or an indication, including information associated with any of a paging window offset and/or multiple minimum and maximum paging offset thresholds, that may be part of the RRC configuration request message. According to embodiments, in a case of receiving such information and/or indication, the RAN node may (e.g., decide to) change the temporary WTRU ID and/or the paging cycle (e.g., I-RNTI, S-TMSI). According to embodiments, in such a case, the updated paging occasion set of the MUSIM WTRU may satisfy a power-efficient multiple paging occasion monitoring operation. According to embodiments, the updated WTRU idle mode information may be transferred as part of the RRC reconfiguration signaling, for example, prior to the WTRU transitioning to the idle/inactive mode.

Figure 3:
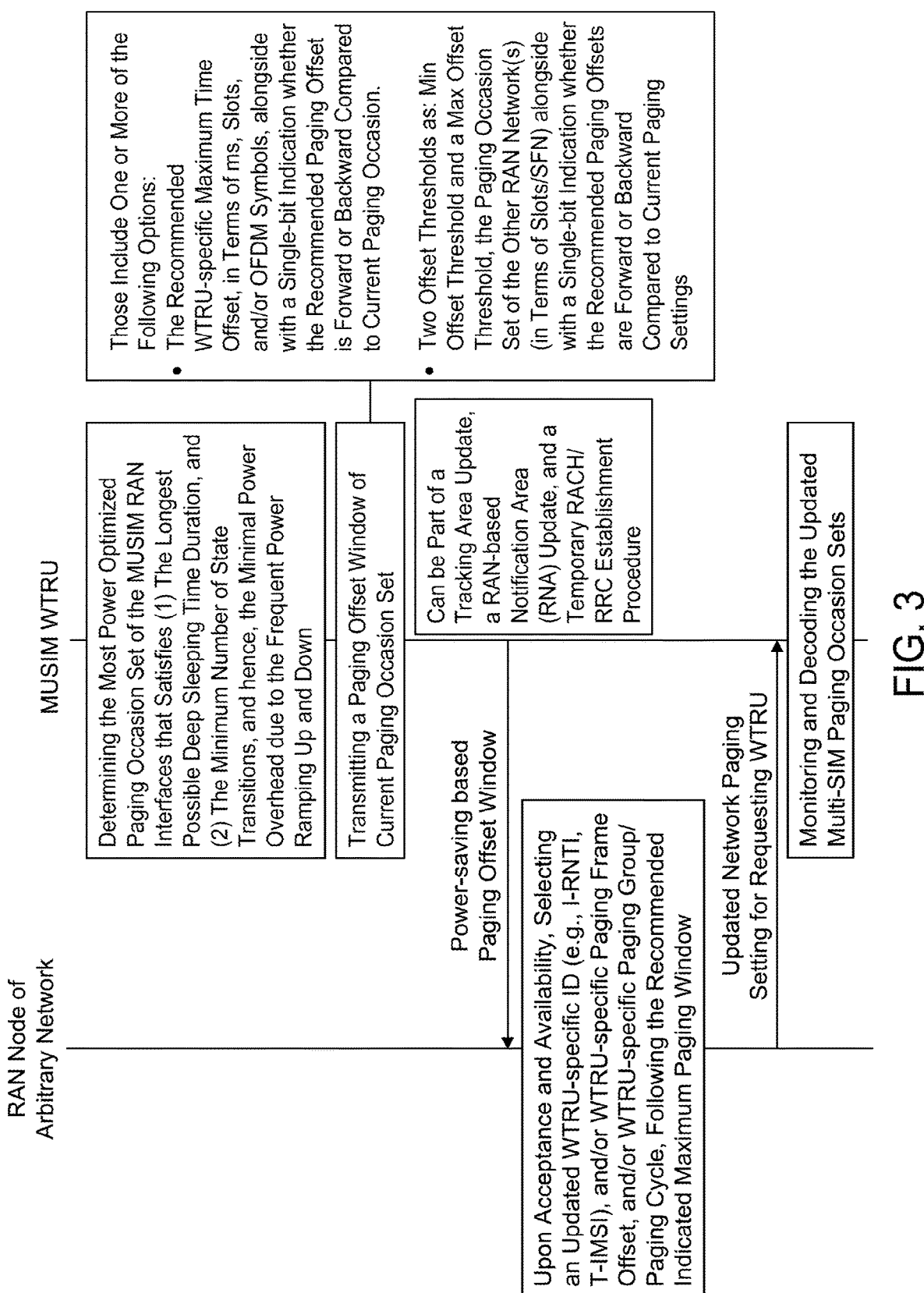
FIG. 3 is a diagram illustrating an example of a WTRU-assistance based paging optimization, according to embodiments.

FIG. 3 is a diagram illustrating WTRU-assistance based paging optimization, according to embodiments.

Referring to FIG. 3, according to embodiments, there may be any of operations, procedures, timelines, signaling flows, features, signals, information, etc., for a (e.g., new, newly proposed, etc.) WTRU-assistance based paging optimization, for example, as discussed below. According to embodiments, WTRU-assistance based paging optimization may include any of the following: (1) an idle/inactive (e.g., mode) MUSIM WTRU transmitting, to a (e.g., selected) RAN node, information indicating: (i) a paging offset window, (ii) a maximum time offset (e.g., in ms, slots, subframes, etc.) of the paging occasion set, and (iii) an indication of the required window as a forward or backward offset as compared to the current configured paging occasion set; (2) the RAN node receiving the required paging offset window and updating the paging WTRU ID and/or paging cycle; and (3) the idle/inactive (e.g., mode) MUSIM WTRU monitoring, determining, and decoding the updated power-optimized multi-SIM paging occasions with an updated cycle of the power ramping up and down.

FIG. 4 is a diagram illustrating WTRU actions/procedures for power efficient MUSIM paging, according to embodiments; and FIG. 5 is a diagram illustrating WTRU actions/procedures for power efficient MUSIM paging with primary network and anchor network determinations, according to embodiments.

According to embodiments, for example, referring to FIG. 4, an idle/inactive MUSIM WTRU may perform any of the following operations (e.g., actions, procedures, features, steps, characteristics, etc.). According to embodiments, as a first operation, a WTRU (e.g., a MUSIM WTRU) may receive configurations from a serving RAN/core node, for example, in the form of an enabling indication of the MUSIM WTRU-assisted paging optimization feature. According to embodiments, as a second operation, the WTRU may determine the most power optimized paging occasion set of the MUSIM RAN interfaces that satisfies one or more of (1) a longest possible deep sleeping time duration, (2) a minimum number of state transitions, which may result in, for example, a minimal power overhead due to the (e.g., reduced) frequency of power ramping up and down, and (3) a minimum power penalty associated with power state transitions.

According to embodiments, as a third operation, a WTRU (e.g., an idle/inactive MUSIM WTRU) may transmit a paging occasion offset/window and a single bit time direction indication (e.g., indicating forward or backward) to one or more of the MUSIM RAN nodes. According to embodiments, as a fourth operation, a WTRU may receive and update an (e.g., updated) paging occasion of one or more of the MUSIM RAN networks, for example, using an indication for any of: a newly updated WTRU ID (RNTI), a paging group ID, a paging pattern ID, and a paging cycle. According to embodiments, as a fifth operation, a WTRU may monitor, detect, and decode the updated paging occasions of the MUSIM networks, and, for example, as a result may execute the minimal number of state transitions.

According to embodiments, for power efficient MUSIM paging, a MUSIM WTRU may (e.g., first) determine a primary network and (e.g., corresponding) anchor networks, for example, from among (e.g., based on) a pool of the active (e.g., multiple) networks (e.g., active SIM cards). According to embodiments, in such a case, the primary and anchor networks are identified by WTRUs, for example, wherein the (e.g., WTRU-proposed) paging offsets and/or windows are/is always unidirectional (e.g., forward or backward), for example, depending on the higher-layer configurations from the RAN/core interface. For example, according to embodiments, a RAN (e.g., and/or core network) may configure WTRUs of power-efficient paging assistance, (e.g., only) with a forward offset/window direction. According to embodiments, in such a case, WTRUs may determine the configured paging occasions of the multi networks, and (e.g., thus/hence) may select the primary network from the (e.g., multiple) connected networks. According to embodiments, the primary network's configured paging occasion may be (e.g., serve as, act as, etc.) a reference to/for other anchor networks, for example, such that the signaled paging window/offset is always forward in time. According to embodiments, (e.g., after the selecting of the primary network) a WTRU may determine a (e.g., an actual) paging offset/window duration, in the allowed time direction, for example, according to (e.g., depending on) configured paging occasions of the multiple/active networks, for example, so that the longest possible deep sleeping period is achieved with minimal power state transitions.

Referring to FIG. 5, according to embodiments, there may be any of operations, procedures, timelines, signaling flows, features, signals, information, etc., for a (e.g., new, newly proposed, etc.) power efficient MUSIM paging with primary network and anchor network determinations, for example, as discussed below. According to embodiments, as a first operation a WTRU (e.g., an idle/inactive MUSIM WTRU) may receive, from a serving RAN node, configurations in the form of an enabling indication of the MUSIM WTRU-assisted paging optimization feature and an indication to whether time forward or backward paging window is allowed. According to embodiments, as a second operation the WTRU may select a primary network (e.g., wherein the primary network's paging occasion(s) is/are considered as the reference to the paging occasions of the anchor networks) and anchor networks, from the pool of active networks, such that a paging offset/window is unidirectional, following the configured paging window direction.

According to embodiments, as a third operation the WTRU may determine the most power optimized paging occasion sets of the identified anchor networks that satisfy (1) the longest possible deep sleeping time duration, (2) the minimum number of state transitions, which may, for example, allow for the minimal power overhead due to (e.g., for) the (e.g., less frequent) power ramping up and down, and/or (3) a minimum power penalty associated with power state transitions. According to embodiments, as a fourth operation the WTRU may transmit a paging occasion offset/window to one or more of the anchor RAN nodes. According to embodiments, as a fifth operation the WTRU may receive and update the (e.g., updated) paging occasion(s) of one or more of the anchor networks, for example, using an indication for any of: a newly updated WTRU ID (e.g., RNTI), a paging group ID, a paging pattern ID, and/or a paging cycle. According to embodiments, as a sixth operation the WTRU may monitor, detect, and decoding the updated paging occasions of the MUSIM networks, and may execute the minimal number of state transitions.

From the foregoing and according to embodiments a WTRU may be configured to send a message indicating that the WTRU is a multi-subscriber identity module (MUSIM) device to at least a first network and then receive information from the first network indicating an initial paging occasion associated with the first network. The network may be a RAN, RAN node, node or other element of a CN or other communications system. The WTRU may send paging assistance information to the first network. The paging assistance information may include, among other things a first offset, a second offset, and a direction indication. According to embodiments, the first offset may indicate a minimum offset relative the initial paging occasion associated with the first network, the second offset may indicate a maximum offset relative to the initial paging occasion associated with the first network, and the direction indication may indicate whether the first and second offsets should be applied before or after the initial paging occasion associated with the first network. Thereafter, the WTRU may receive (e.g., from the first network) information indicating an updated paging occasion associated with the first network. The updated paging occasion associated with the first network may be signaled as one of a new WTRU-ID, paging group ID, paging pattern ID, paging cycle and/or other information.

In embodiments, the first and second offsets of the first network may be determined by the WTRU (or otherwise) based a paging occasion associated with a second network. Further, the first and second offsets of the first network may (e.g., preferably) be optimized relative to power usage of the WTRU. In embodiments, the first and second offsets of the first network may be optimized for the longest possible deep sleeping time duration between paging occasions, a minimum number of state transitions, and/or a minimum power penalty associated with power state transitions. In embodiments, the first and second offsets for the first network may be determined (e.g., in addition) based on a minimum and maximum offset thresholds for a set of paging occasions for both the first and second networks.

In embodiments, the WTRU may select the first and second networks, for example, from a pool of (e.g., multiple) active and available networks such that the first and second offsets of the first network have a unidirectional indication. In embodiments, the updated paging occasion associated with the first network occurs between the minimum and maximum offsets relative to the initial paging occasion associated with the first network. In embodiments, one or more of the other elements discussed herein relative to the methods performed and configurations of the network and/or WTRU may be combined and incorporated into the configuration.

In embodiments, a method of operation may be performed by a WTRU and/or a network having, among others, the steps of sending a message to a at least first network indicating that the WTRU is a MUSIM device, receiving information indicating an initial paging occasion associated with the first network; sending paging assistance information including, among other things, a first offset, a second offset, and a direction indication. In embodiments, the first offset may indicate a minimum offset relative the initial paging occasion associated with the first network, the second offset may indicate a maximum offset relative to the initial paging occasion associated with the first network, and the direction indication may indicate whether the first and second offsets should be applied before or after the initial paging occasion associated with a network. The method may further include receipt of information indicating that an updated paging occasion associated with the network has been defined.

In embodiments, the method of operation may include the sending a message to a second network indicating that the WTRU is a MUSIM device and the sending and/or receiving of information regarding the second network indicating a second network initial paging occasion. In embodiments, the first and second offsets of the first network may be determined based on the second network paging occasion, may be optimized relative to power usage of the WTRU and/or may be optimized for the longest possible deep sleeping time duration between paging occasions, a minimum number of state transitions, and/or a minimum power penalty associated with power state transitions. In embodiments, one or more of the other elements discussed herein relative the methods performed and configurations of the network and/or WTRU may be included or combined into the method performed.

The following are incorporated by reference: [1] R1-2101503, Paging enhancements for UE power saving; [2] R1-2101555, Design of Paging Enhancements; [3] R1-2101622, Discussion on paging enhancements; [4] R1-2101475, TRS CSI-RS for idle inactive UE power saving; [5] R1-2101623, Discussion on TRS CSI-RS occasion for idle/inactive UEs; [6] Y. R. Li, M. Chen, J. Xu, L. Tian and K. Huang, "Power Saving Techniques for 5G and Beyond," in IEEE Access, vol. 8, pp. 108675-108690, 2020; [7] 3GPP TR 38.840 V16.0.0 (2019-06); [8] R1-2103389, "Analysis on power consumption for IDLE mode and Red-Cap", Huawei; [9] R2-2105978, "Paging collision avoidance", Ericsson; and [10] R2-2106103, "Solution analysis for supporting Multi-SIM paging cause", Intel.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1E.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra-Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A wireless transmit/receive unit (WTRU) configured to:
send a message indicating that the WTRU is a multi-subscriber identity module (MUSIM) device to a first network;
receive information indicating an initial paging occasion associated with the first network;
send paging assistance information to the first network, the paging assistance information comprising a first offset, a second offset, and a direction indication, wherein the first offset indicates a minimum offset relative the initial paging occasion associated with the first network, the second offset indicates a maximum offset relative to the initial paging occasion associated with the first network, and the direction indication indicates whether the first and second offsets should be applied before or after the initial paging occasion associated with the first network; and
receive information indicating an updated paging occasion associated with the first network.

2. The WTRU as in claim 1, wherein the first and second offsets are determined based on a paging occasion associated with a second network.

3. The WTRU as in claim 2, wherein the first and second offsets are optimized based on one or more of
(a) a relative to power usage of the WTRU;
(b) a longest possible deep sleeping time duration between paging occasions,
(c) a minimum number of state transitions, or (d) a minimum power penalty associated with power state transitions.

4. The WTRU as in claim 2, wherein the first and second offsets are determined based on a minimum and maximum offset thresholds for a set of paging occasions for both the first and second networks.

5. The WTRU as in claim 2 further configured to:
select the first and second networks such that the first and second offsets have a unidirectional indication.

6. The WTRU as in claim 1, wherein the updated paging occasion associated with the first network occurs between the minimum and maximum offsets relative to the initial paging occasion associated with the first network.

7. The WTRU as in claim 1, wherein the information indicating the updated paging occasion associated with the first network is signaled as at least one of a new WTRU-ID, a paging group ID, a paging pattern ID, or a paging cycle.

8. A method performed by a wireless transmit/receive unit (WTRU) comprising the steps of:
sending a message to a first network indicating that the WTRU is a multi-subscriber identity module (MUSIM) device;
receiving information from the first network indicating an initial paging occasion associated with the first network;
sending paging assistance information to the first network, the paging assistance information comprising a first offset, a second offset, and a direction indication, wherein the first offset indicates a minimum offset relative the initial paging occasion associated with the first network, the second offset indicates a maximum offset relative to the initial paging occasion associated with the first network, and the direction indication indicates whether the first and second offsets should be applied before or after the initial paging occasion associated with the first network; and
receiving information indicating an updated paging occasion associated with the first network.

9. The method as in claim 8, comprising the steps of:
sending a message to a second network indicating that the WTRU is a MUSIM device;
receiving information from the second network indicating a second network initial paging occasion; and
wherein the first and second offsets of the first network are determined based on the second network paging occasion.

10. The method as in claim 9, further comprising optimizing the first and second offsets of the first network to one or more of
(a) a relative power usage of the WTRU;
(b) a longest possible deep sleeping time duration between paging occasions,
(c) a minimum number of state transitions, or
(d) a minimum power penalty associated with power state transitions.

11. The method as in claim 9, further comprising:
determining the first and second offsets for the first network based on a minimum and maximum offset thresholds for a set of paging occasions for both the first and second networks.

12. The method as in claim 9 further comprising:
selecting the first and second networks such that the first and second offsets of the first network have a unidirectional indication.

13. The method as in claim 8, wherein the updated paging occasion associated with the first network occurs between the minimum and maximum offsets relative to the initial paging occasion associated with the first network.

14. The method as in claim 8, wherein the information indicating the updated paging occasion associated with the first network comprises at least one of a new WTRU-ID, a paging group ID, a paging pattern ID or a paging cycle.

15. A wireless transmit/receive unit (WTRU) configured to:

send a message indicating that the WTRU is a multi-subscriber identity module (MUSIM) device to a first network;

receive information indicating an initial paging occasion associated with the first network;

receive information indication a paging occasion associated with a second network;

determine paging assistance information comprising a first offset, a second offset, and a direction indication, wherein the first offset indicates a minimum offset relative the initial paging occasion associated with the first network and paging occasion associated with the second network, the second offset indicates a maximum offset relative to the initial paging occasion associated with the first network, and the direction indication indicates whether the first and second offsets should be applied before or after the initial paging occasion associated with the first network;

send the determined paging assistance information to the first network, and receive information indicating an updated paging occasion based on the paging assistance information.

16. The WTRU as in claim 15, wherein the first and second offsets are determined based on a minimum and maximum offset thresholds for a set of paging occasions for both the first and second networks.

17. The WTRU as in claim 15, wherein the updated paging occasion associated with the first network occurs between the minimum and maximum offsets relative to the initial paging occasion associated with the first network.

18. The WTRU as in claim 15, wherein the first and second offsets are optimized based on one or more of (a) a relative to power usage of the WTRU;

(b) a longest possible deep sleeping time duration between paging occasions, (c) a minimum number of state transitions, or (d) a minimum power penalty associated with power state transitions.

19. The WTRU as in claim 15, wherein the information indicating the updated paging occasion associated with the first network is signaled as at least one of a new WTRU-ID, a paging group ID, a paging pattern ID, or a paging cycle.

* * * * *